Figure 1:
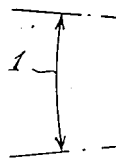
Figure 1:
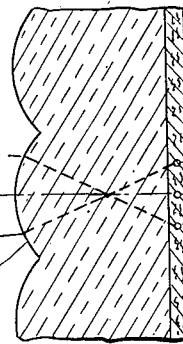

June 23, 1936. C. L. FARRAND 2,045,129

PRINTING

Filed Sept. 28, 1933

INVENTOR
CLAIR L. FARRAND
BY W. E. Beatty
ATTORNEY

Patented June 23, 1936

2,045,129

UNITED STATES PATENT OFFICE 2,045,129

PRINTING

Clair L. Farrand, Larchmont, N. Y., assignor to United Research Corporation, Long Island City, N. Y., a corporation of Delaware Application September 28, 1933, Serial No. 691,265

4 Claims. (Cl. 88—24)

The invention relates to method and apparatus for preparing motion picture positive prints from motion picture negative film carrying interlined parallax stereograms.

It has for an object to prepare positives showing detailed rendition of the negative without moiré effects.

It has for another object, the establishment of a projection printing arrangement for motion picture interlined stereograms which is not critical as to adjustment other than focus.

A further object is to provide a projection printing arrangement for motion picture interlined stereograms which is not critical as to registration, alinement or exact identity between negative and positive lineators beyond the limits of convenient mechanical construction.

The invention provides an apparatus with which it is possible to print motion picture interlined stereo positives of one line frequency from motion picture interlined stereo negatives having a different line frequency.

The invention also provides method and apparatus whereby a positive film having a cooperating lineator can, through a printing operation, be made to exhibit stereoscopic relief through a wider viewing angle than the horizontal angle through which the object was photographed in recording the negative stereogram.

Recent work by others has set forth the specific conditions and requirements governing the successful formation of interlined parallax stereograms on motion picture film. When motion picture interlined parallax stereogram negatives are produced in accordance with certain limitations, I have found that the conditions governing the printing of such negatives into positives are much more tangible than have heretofore been indicated and that they may be successfully met by the apparatus which I here propose as the subject of this application.

I find that it is only necessary to employ a lens somewhat larger than the horizontal dimension of the negative by a definite amount which I will subsequently indicate. Instead of similar gratings before the negative and positive, I have found that dissimilar gratings may be used provided certain conditions of angular deviation of the light beams are maintained and I have found that by proper choice of gratings it is possible to print stereoscopic positives showing one screen pitch from negatives which show another screen pitch. Also, I have found that by printing from a film having a thick base and ribs with a comparatively large curvature to a film having a thinner base and ribs with a smaller radius of curvature, the thinner base positive print will exhibit stereoscopic relief through a wider angle than the viewing angle recorded on the thicker negative.

Figure 2:
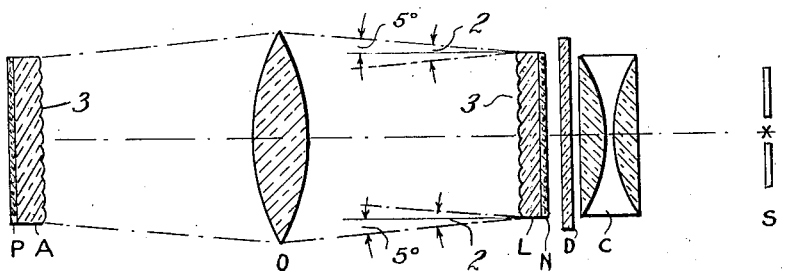
Figure 3:
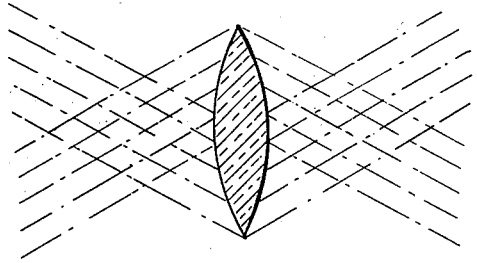
Figure 4:
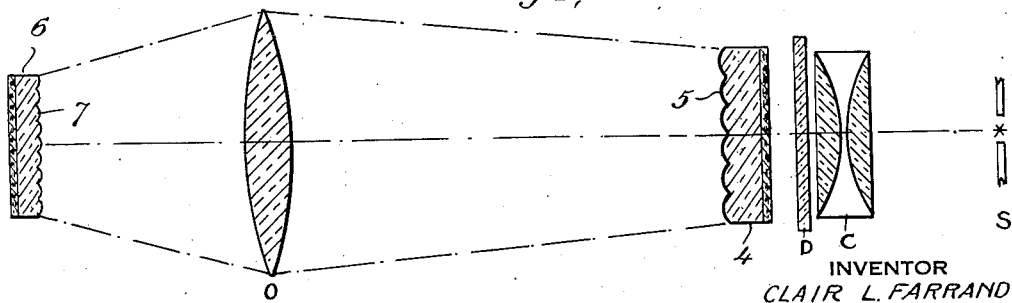

In the drawing, Figure 1 diagrammatically indicates the horizontal deviation introduced into the rays emanating from several representative positions, $a$, $b$, $c$, in the emulsion by a ribbed refracting element of the lineator. Figure 2, is a diagrammatic plan view of a printing arrangement according to the invention. In Figure 3, is a schematic plan view showing the action of an objective lens in reversing the direction of horizontally deviated beams of light. Figure 4 is a schematic plan view of a modification of Figure 2 for printing from one kind of self analyzing film to another.

Referring to Figure 2, the method and apparatus which I have developed consists in placing a negative interlined stereographic film N, before a collimator C, which causes the light from the source S to fall upon the diffusing screen D as a beam of parallel rays. On the side of the negative N away from the collimator C, I place a lineator L which may be either an opaque lined grating, a ribbed refracting grating or a lenticulated or goffered grating so long as it serves to transmit the light emanating from each picture line element through an angular deviation equal to the original object viewing angle recorded within that point or line of the negative. At a suitable distance before this lineator I place a photographic objective shown at O. This objective may be chosen from among available commercial photographic objectives, though it should preferably be one of the highly corrected types and one of the principal requisites is that it shall be of sufficient size or working aperture so that when properly focused it will embrace the full deviation angle 1 of Figure 1 which is the same as angle 2 of Figure 2 and both of which may be 10 degrees as illustrated from any point of the lineator L. Another requisite of the objective O is that effective vertical zones of the lens be capable of forming images of good definition. Its function in reversing the direction of the inclined light is of as much importance as its function of focusing the image; the latter also being handled by the optical elements or curved vertical ribs 3 of the lineators L and A.

Assuming negative N in Figure 2 to be 35 mm. motion picture film, and that the object has been photographed through a horizontal angle of ten degrees, the objective O has a diameter larger than 35 mm. by an amount equal to 2 $d$ tan 5° where $d$=the distance of objective O from negative N. If $d$=150 mm. then the diameter of objective O is 61.25 mm., the F value then being 2.45. The width of film N, the distance of objective O from film N, and the angle 2 may be varied as desired, the diameter of objective O, for any given values of the three variables mentioned, being determined as above indicated.

In practice and for ordinary viewing angles, the above conditions are fulfilled by good objectives having working apertures in the vicinity of F—2 although it will be seen that this requirement is largely governed by the aforementioned taking angle of the original photographing apparatus and/or the dispersion angle of the lineator L. I say "or the dispersion angle of the lineator L" because it can be readily seen that if for certain special purposes it seems desirable to correct or falsify the original taking angle by using a lineator having a dispersion angle slightly different from (i. e., greater or less than) the taking angle of the original camera, such a procedure is readily possible.

Beyond the objective O at a suitable focal distance I place another lineator A and behind this lineator I place the positive film P. When it is desired to print a positive preserving the original stereoscopic relief characteristics of the negative, this analyzing lineator A is preferably identical with the lineator L, but for various purposes it is possible to substitute analyzing lineators of different characteristics from that of the lineator L. For example, L may be a ribbed lineator integral with negative N and A, a line screen of equal pitch, or L may be a ribbed lineator of one spacing and pitch and A may be a ribbed analyzer (integral with positive P) of a different spacing or pitch. Or, both the lineators L and A may be line screens, or alternatively, ribs, goffs or the like integral with their respective film bases.

In practice, for motion picture work it is found convenient to employ films both for the negative and the positive in which the lineator and the sensitive surface are carried upon the same base. Such films of various types are available on the market, for example, the common Kodacolor film of the Eastman Company, and have the added advantage that they maintain inherent registration between the lineator and the lines of the image.

If the foregoing conditions are fulfilled, light emanating from any point on the negative N with any given horizontal inclination will be imaged upon a corresponding point on the positive P with a corresponding inclination and a true positive print obtained, as desired.

A careful consideration of the optical system of Figure 2 will show that so long as the objective O is of good enough quality to properly reverse the direction of the deviated light rays emanating from the elements of the lineator L as indicated in Figure 3, and so long as the aperture of the objective O is great enough, as aforementioned, to embrace all of the dispersion angle of the light emanating from any point of the negative N (particularly the lateral extremes) then this system may be used to produce either positive prints having identical properties with the master negative N, or by altering the optical factors of one or more elements, a large variety of corrected, altered or distorted positive prints presenting the photographic object with its line frequency, size, relief depth or other properties made to vary at will from those recorded in the original negative.

An example of a modification which can be effected in the stereogram record by the printing operation is illustrated in Figure 4, wherein a source of light S, collimator C and diffusing screen D are employed as in Figure 2. In Figure 4 however, the stereogram negative record is carried by a negative film 4 having a comparatively thick base with integral ribs 5 having a comparatively large radius of curvature. The positive film 6, on which the stereogram record of the film 4 is printed by means of the objective O, has a comparatively thin base with integral ribs 7 having a comparatively small radius of curvature. The objective O is arranged closer to film 6 than it is to film 4. The size of objective O with relation to film 4 is determined as explained in Figure 2, whereby the objective O is larger than film 4 by an amount sufficient to embrace the angle through which the picture line elements were viewed by the taking camera and therefore recorded on film 4. As objective O is closer to film 6 than it is to film 4, the images of the picture line elements in reduced size will be recorded on film 6 through a wider angle than they were recorded on and projected from film 4. The stereogram record on the positive 6 can therefore be viewed through a wider angle than the viewing angle employed in exposing the negative 4. The line pitch of ribs 5 and 7 may be the same or different as above explained.

In Figure 4 instead of using film bases of different thicknesses, and ribs of different curvature, substantially the same results can be achieved by employing for the films, 4 and 6, materials having different refractive indices. Also, instead of employing ribs integral with a film base, the lineators, 5 and 7, may be opaque line screens. In the latter case, however, there is not the advantage of avoiding the necessity for accurate registration between the negative 4 and positive 6. It will be understood that the reason it is not necessary to accurately register negative 4 with positive 6 in the case where they have integral ribs, as illustrated in Figure 4, is due to the fact that each rib 5 of the negative emits a comparatively large beam of light, a substantial portion of which will be focused on to a corresponding rib 7 on the positive 6, it making no particular difference whether one portion or another of this beam is so focused. In the case of the line screen, however, the opaque element is much larger than the aperture so that a very narrow beam of light is emitted by each aperture in the opaque line screen, thus necessitating accurate registration of the negative line screen with the positive line screen in order that the narrow beam of light from a given aperture in the negative line screen may reach an aperture in the positive line screen instead of falling on the comparatively large opaque portion thereof.

Preferably, the positive and negative films in Figures 2 and 4 have a line pitch such that there are more than 300 and less than 600 lines per inch, and therefore a corresponding number of groups of picture line elements.

Also preferably, with the emulsions now commercially available, each picture line element has a width comparable to the width of five silver grains in the emulsion, and each picture line element is a record of the object from a discrete viewpoint. Also the number of picture line elements in each group is the same as the number of discrete viewpoints from which the object was photographed. However, any other type of interlineated stereogram may be employed as the negative in the above mentioned printing arrangement.

Having thus described the invention, what is claimed as new and desired to secure by Letters Patent, is:

1. Printing apparatus comprising a negative stereogram, a lineator therefor, means for uniformly illuminating said negative stereogram, a positive, a second lineator in front of said positive, an objective between negative and said positive, said objective having a diameter equal substantially to $2d \tan \theta$, where "$d$" is the distance of said objective from said negative, and $\theta$ equals one half of the viewing angle recorded on said negative.

2. Printing apparatus comprising a negative stereogram, means for uniformly illuminating said negative stereogram, said negative having a comparatively thick base and vertical ribs with comparatively large curvature, a positive having a comparatively thin base and vertical ribs with comparatively small curvature, and an objective between said negative and said positive and arranged closer to said positive than to said negative.

3. Printing apparatus comprising a negative interlined stereogram, means for uniformly illuminating said negative, a positive, an objective between said negative and said positive, a lineator having a given line pitch and arranged between said negative and said objective, and a lineator having a different line pitch and arranged between said positive and said objective, the position of said objective with respect to said lineators being determined by the differential between the line pitch of each of said lineators.

4. Arrangement for photographically producing a stereogram comprising means for supplying light in accordance with different angular views of an object, the light diverging horizontally from said means and a single objective lens adapted to receive said diverging light, said objective lens being wider than said light supplying means by an amount equal to $2d \tan \theta$ where "$d$" is the distance between said means and said objective, and $\theta$ is one-half of said photographic recording angle.

CLAIR L. FARRAND.